US011862907B2

(12) United States Patent
Maesoba et al.

(10) Patent No.: US 11,862,907 B2
(45) Date of Patent: Jan. 2, 2024

(54) CONNECTOR WITH CABLE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Hiroyoshi Maesoba, Mie (JP); Toshifumi Ichio, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(*) Notice: Subject to any disclaimer, the term of this patent is extended or adjusted under 35 U.S.C. 154(b) by 33 days.

(21) Appl. No.: 17/629,734

(22) PCT Filed: Jul. 22, 2020

(86) PCT No.: PCT/JP2020/028470
§ 371 (c)(1),
(2) Date: Jan. 24, 2022

(87) PCT Pub. No.: WO2021/029201
PCT Pub. Date: Feb. 18, 2021

(65) Prior Publication Data

US 2022/0255270 A1 Aug. 11, 2022

(30) Foreign Application Priority Data

Aug. 9, 2019 (JP) ................................ 2019-147192

(51) Int. Cl.
*H01R 24/22* (2011.01)
*H01R 13/405* (2006.01)
(Continued)

(52) U.S. Cl.
CPC ........... *H01R 24/22* (2013.01); *H01R 13/405* (2013.01); *H01R 13/6271* (2013.01); *H01R 43/048* (2013.01)

(58) Field of Classification Search
CPC .............. H01R 9/0518; H01R 13/6592; H01R 13/6593; H01R 13/6581; H01R 13/65912;
(Continued)

(56) References Cited

U.S. PATENT DOCUMENTS 6,692,299 B1 * 2/2004 Stockmaster ........ H01R 9/0518 439/578
7,044,756 B1 * 5/2006 Asakura .............. H01R 13/648 439/607.41
(Continued)

FOREIGN PATENT DOCUMENTS

JP 2010-170934 A 8/2010
JP 2012-221924 A 11/2012

OTHER PUBLICATIONS

International Search Report dated Sep. 24, 2020 for WO 2021/029201 A1 (4 pages).

*Primary Examiner* — Truc T Nguyen
(74) *Attorney, Agent, or Firm* — Venjuris, P.C.

(57) ABSTRACT

A connector with cable is provided with a cable including a wire, a sheath and a braided member interposed between the wire and the sheath, the braided member being formed by braiding conductive wire materials, the braided member being provided with a folded portion formed by folding the braided member exposed from an end of the sheath toward the sheath, a sleeve made of metal and externally fit to an outer surface of the sheath inside the folded portion in a radial direction of the cable, a shield member made of metal and including a barrel for sandwiching the folded portion between the sleeve and the barrel while being crimped to an outer surface of the folded portion, and a housing covered
(Continued)

with the shield member. A sleeve-side protrusion projecting radially outwardly of the cable is formed on a rear end part of the sleeve.

3 Claims, 13 Drawing Sheets

(51) Int. Cl.
*H01R 13/627* (2006.01)
*H01R 43/048* (2006.01)

(58) Field of Classification Search
CPC ...... H01R 13/648; H01R 9/05; H01R 9/0524; H01R 43/048; H01R 13/65914; H01R 24/03
See application file for complete search history.

(56) References Cited

U.S. PATENT DOCUMENTS

| | | | | |
|---|---|---|---|---|
| 10,791,660 | B2* | 9/2020 | Kitagawa | H01B 7/18 |
| 10,910,734 | B2 | 2/2021 | Hamada et al. | |
| 2002/0084094 | A1* | 7/2002 | DeForest, Jr. | H01R 13/53 174/75 C |
| 2004/0058582 | A1* | 3/2004 | Wendling | H01R 9/0518 439/582 |
| 2016/0093984 | A1* | 3/2016 | Iwamoto | H01R 13/65915 439/607.55 |
| 2019/0173243 | A1* | 6/2019 | Annequin | H01R 13/6473 |
| 2019/0318850 | A1* | 10/2019 | Ogino | H01B 13/0006 |
| 2020/0014129 | A1 | 1/2020 | Hamada et al. | |
| 2022/0190538 | A1* | 6/2022 | Schuster | H01B 7/228 |

* cited by examiner

CONNECTOR WITH CABLE

CROSS REFERENCE TO RELATED APPLICATIONS

This application is a national phase of PCT application No. PCT/JP2020/028470, filed on 22 Jul. 2020, which claims priority from Japanese patent application No. 2019-147192, filed on 9 Aug. 2019, all of which are incorporated herein by reference.

TECHNICAL FIELD

The present disclosure relates to a connector with cable.

BACKGROUND

A cable terminal assembly in which a terminal is connected to an end part of a shielded cable is described in Japanese Patent Laid-open Publication No. 2018-147564. This assembly includes the shielded cable in which a braided wire is interposed between a wire and a sheath and provided with a folded portion formed by folding the braided wire exposed from an end of the sheath toward the sheath, a sleeve made of metal and located inside the folded portion in a radial direction of the shielded cable and crimped to the outer surface of the sheath, and the terminal having a barrel for sandwiching the folded portion between the sleeve and the barrel while being crimped to the outer surface of the folded portion. The barrel is formed with a protrusion projecting radially inwardly of the shielded cable at a position behind a rear end part of the sleeve in an axial direction of the shielded cable.

PRIOR ART DOCUMENT

Patent Document

Patent Document 1: JP 2018-147564 A

SUMMARY OF THE INVENTION

Problems to be Solved

If the shielded cable is pulled, the protrusion formed on the barrel supports the rear end part of the sleeve from behind, whereby a fixing force of the shielded cable and the terminal is improved.

However, recently, it has been required to further improve a fixing force of a shielded cable and a terminal.

The present disclosure was completed on the basis of the above situation and aims to improve a fixing force of a cable and a connector.

Means to Solve the Problem

The present disclosure is directed to a connector with cable in which a connector is connected to an end part of a cable, the connector with cable including a cable having a wire, a sheath and a braided member interposed between the wire and the sheath, the braided member being formed by braiding conductive wire materials, the braided member being provided with a folded portion formed by folding the braided member exposed from an end of the sheath toward the sheath, a sleeve made of metal, the sleeve being externally fit to an outer surface of the sheath inside the folded portion in a radial direction of the cable, a shield member made of metal, the shield member having a barrel for sandwiching the folded portion between the sleeve and the barrel while being crimped to an outer surface of the folded portion, and a housing covered with the shield member, wherein the barrel is formed with a barrel-side protrusion projecting radially inwardly of the cable at a position behind a rear end part of the sleeve in an axial direction of the cable, and a sleeve-side protrusion projecting radially outwardly of the cable is formed on a rear end part of the sleeve.

Effect of the Invention

According to the present disclosure, a fixing force of a cable and a connector is improved.

DETAILED DESCRIPTION TO EXECUTE THE INVENTION

[Description of Embodiments of Present Disclosure]

Figure 1:
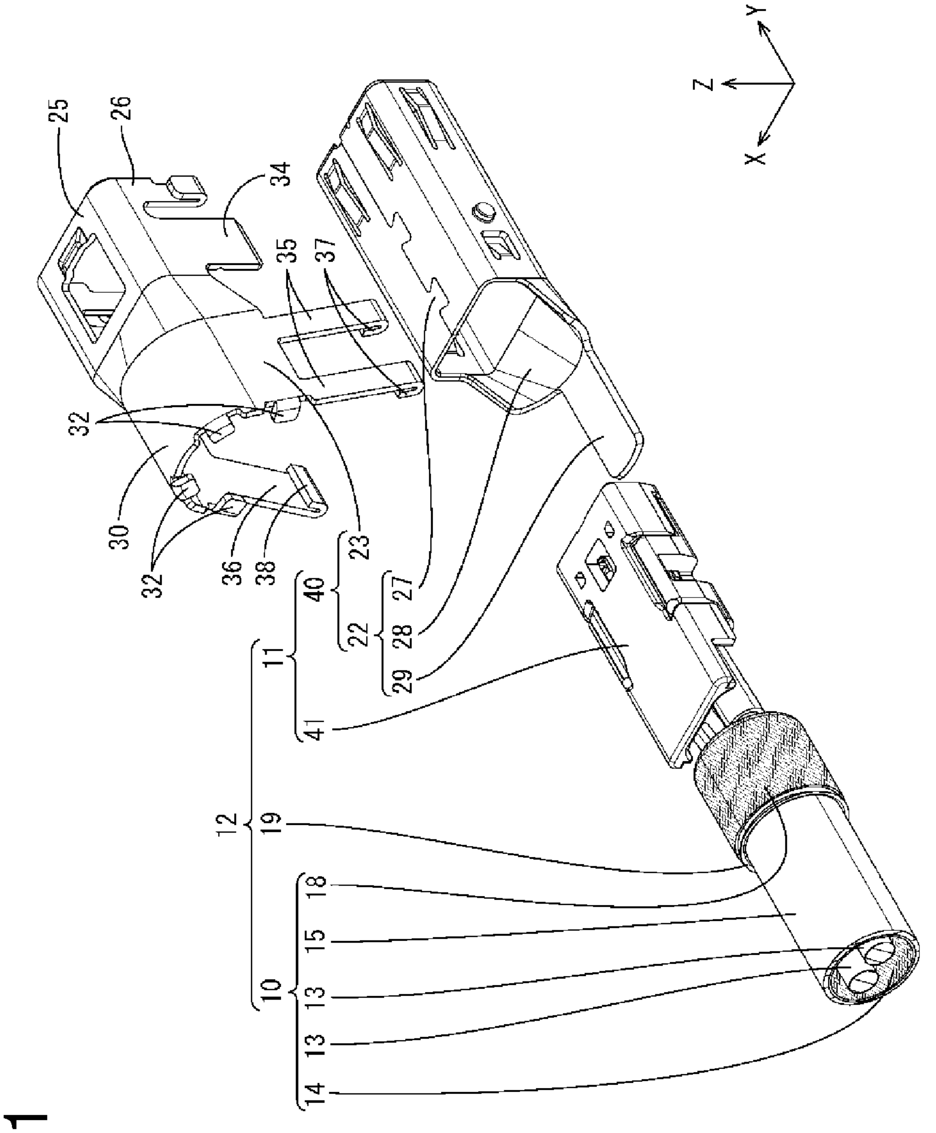
FIG. 1 is an exploded perspective view of a connector with cable according to a first embodiment.

First, embodiments of the present disclosure are listed and described.

(1) The present disclosure is directed to a connector with cable in which a connector is connected to an end part of a cable, the connector with cable including a cable having a wire, a sheath and a braided member interposed between the wire and the sheath, the braided member being formed by braiding conductive wire materials, the braided member being provided with a folded portion formed by folding the braided member exposed from an end of the sheath toward the sheath, a sleeve made of metal, the sleeve being externally fit to an outer surface of the sheath inside the folded portion in a radial direction of the cable, a shield member made of metal, the shield member having a barrel for sandwiching the folded portion between the sleeve and the barrel while being crimped to an outer surface of the folded portion, and a housing covered with the shield member, wherein the barrel is formed with a barrel-side protrusion projecting radially inwardly of the cable at a position behind a rear end part of the sleeve in an axial direction of the cable, and a sleeve-side protrusion projecting radially outwardly of the cable is formed on a rear end part of the sleeve.

According to the above configuration, a contact area of the barrel-side protrusion and the rear end part of the sleeve is increased as compared to the case where the sleeve-side protrusion projecting radially outwardly of the cable is not formed. In this way, a fixing force of the cable and the connector can be improved.

(2) Preferably, a tapered surface expanded in diameter toward a rear side is formed on an inner surface of a rear end edge of the sleeve.

According to the above configuration, in inserting the cable into the sleeve from behind the sleeve, the tapered surface and the cable slide in contact with each other, whereby the cable is guided into the sleeve. As a result, since the efficiency of an operation of inserting the cable into the sleeve can be improved, the manufacturing efficiency of the connector with cable can be improved.

(3) Preferably, an escaping portion for allowing an inner edge part in the radial direction of the cable, out of the barrel-side protrusion, to escape with the barrel crimped to the outer surface of the folded portion is formed to be recessed radially outwardly of the cable on a projecting end edge projecting radially inwardly of the cable, out of the barrel-side protrusion.

According to the above configuration, even if a metal plate material concentrates on the projecting end edge of the barrel-side protrusion in a state after the barrel is crimped to the cable, the formation of creases in the barrel-side protrusion is suppressed.

(4) Preferably, the barrel is provided with a plurality of the barrel-side protrusions spaced apart in the circumferential direction of the cable.

According to the above configuration, since the contact area of the barrel protrusion and the rear end edge of the sleeve can be increased as compared to the case where one barrel protrusion is provided, the fixing force of the cable and the connector can be improved.

[Details of Embodiments of Present Disclosure]

Hereinafter, embodiments of the present disclosure are described. The present invention is not limited to these illustrations and is intended to be represented by claims and include all changes in the scope of claims and in the meaning and scope of equivalents.

<First Embodiment>

A first embodiment according to the present disclosure is described with reference to FIGS. 1 to 9. As shown in FIG. 1, this embodiment relates to a connector with cable 12 in which a connector 11 is connected to an end part of a cable 10. In the following description, a direction indicated by an arrow Z is referred to as an upward direction, a direction indicated by an arrow Y is referred to as a forward direction and a direction indicated by an arrow X is referred to as a leftward direction. Further, for a plurality of identical members, only some may be denoted by a reference sign and the other members may not be denoted by the reference sign.

[Cable 10]

Figure 2:
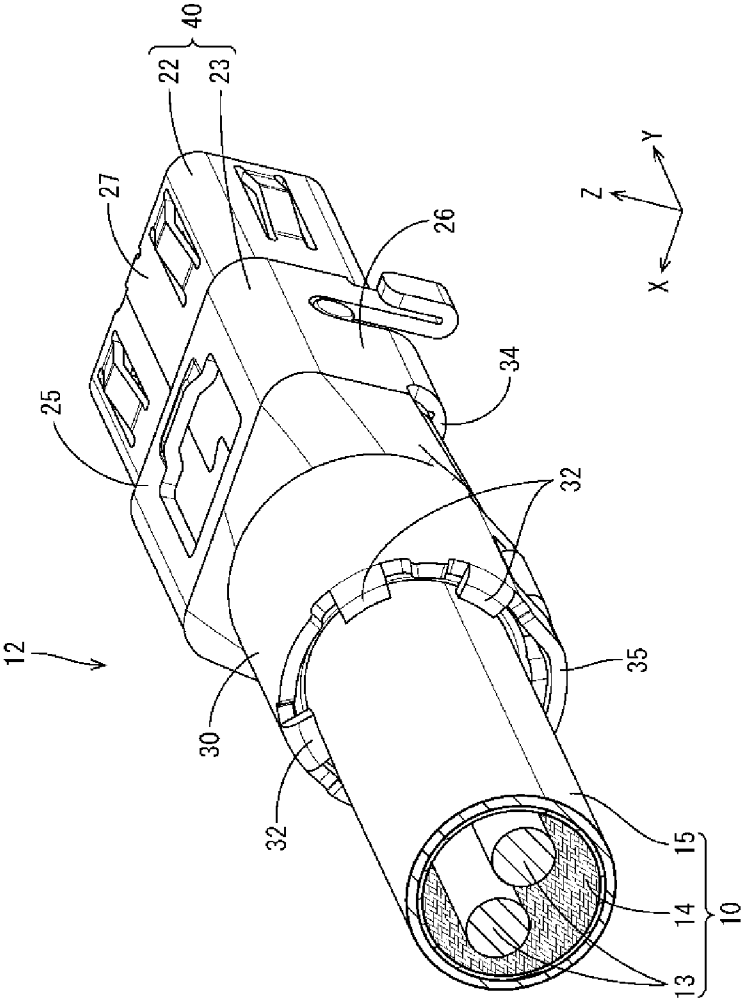
FIG. 2 is a perspective view showing the connector with cable.

As shown in FIG. 2, the cable 10 includes wires 13 (two in this embodiment), a braided member 14 surrounding the outer peripheries of the wires 13 and a sheath 15 made of insulating synthetic resin and surrounding the outer periphery of the braided member 14.

Although not shown in detail, the wire 13 includes a core and an insulation coating made of insulating synthetic resin and surrounding the outer periphery of the core. An arbitrary metal such as copper, copper alloy, aluminum or aluminum alloy can be appropriately selected as a metal constituting the core if necessary. In this embodiment, copper or copper alloy is used. An unillustrated terminal is connected to the tip of the wire 13.

The braided member 14 is formed by braiding a plurality of conductive wire materials into a tubular shape. The conductive wire materials are not particularly limited, but are wire materials made of metal in this embodiment. An arbitrary metal such as copper or copper alloy can be appropriately selected as a metal constituting the wire materials made of metal if necessary. Wire materials made of synthetic resin and covered with a metal foil may be, for example, used as the conductive wire materials.

As shown in FIG. 1, the sheath 15 in a front end part of the cable 10 (front end part in an axial direction of the cable 10) is stripped. In this way, the wires 13 and the braided member 14 are exposed from an end of the sheath 15. The braided member 14 exposed from the end of the sheath 15 includes a folded portion 18 folded toward the end of the sheath 15. In other words, the folded portion 18 is shaped by folding the braided member 14 exposed forward in the axial direction from a front end part of the sheath 15 rearward in the axial direction. Note that the axial direction of the cable 10 is described as a direction parallel to a front-rear direction in this embodiment.

The folded portion 18 is formed to overlap on the sheath 15 of the cable 10 from a radially outer side of the cable 10.

[Sleeve 19]

As shown in FIG. 1, the sleeve 19 is made of metal and formed into a hollow cylindrical shape. An arbitrary metal such as copper, copper alloy, aluminum or aluminum alloy can be appropriately selected as a metal constituting the sleeve 19 if necessary. In this embodiment, copper or copper alloy is used.

Figure 3:
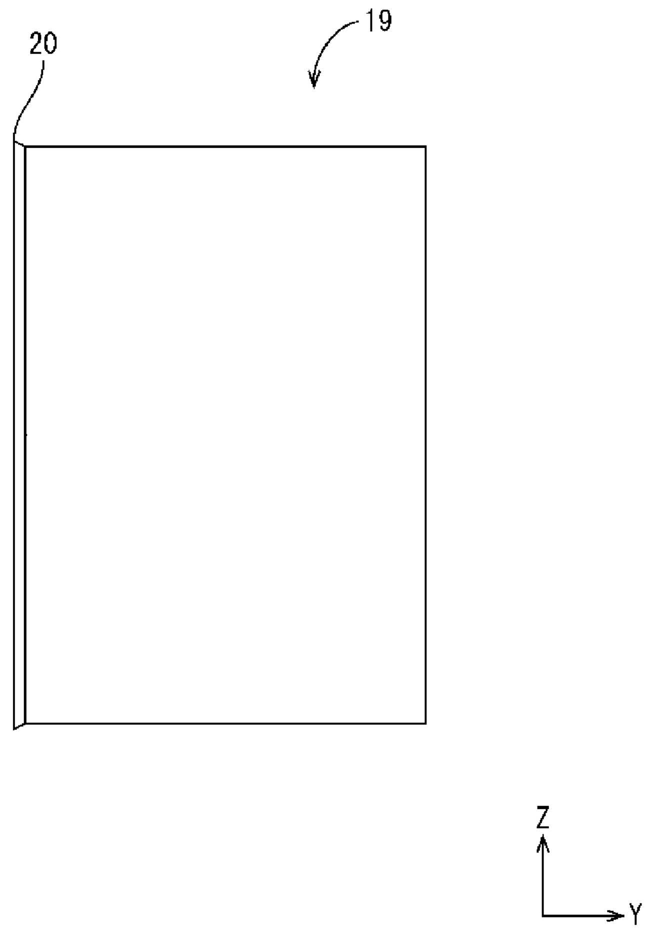
FIG. 3 is a side view showing a sleeve.
Figure 4:
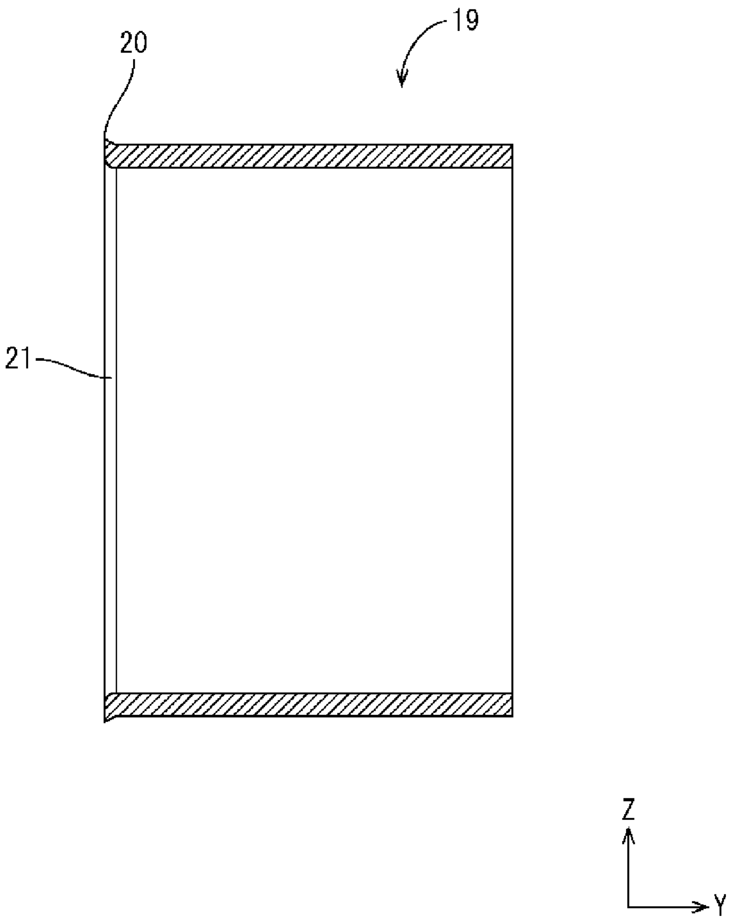
FIG. 4 is a side view in section showing the sleeve.

As shown in FIG. 3, a sleeve-side protrusion 20 projecting radially outwardly of the sleeve 19 is formed on a rear end part of the sleeve 19. The sleeve-side protrusion 20 according to this embodiment is continuously formed in a circumferential direction of the sleeve 19. A tapered surface 21 expanded in diameter toward a rear side is formed at a position corresponding to the sleeve-side protrusion 20 on the inner surface of the sleeve 19.

[Connector 11]

As shown in FIG. 1, the connector 11 includes a shield member 40 made of metal and a housing 41 covered with the shield member 40.

[Housing 41]

The housing 41 is formed by injection molding an insulating synthetic resin material. The housing 41 has a substantially rectangular parallelepiped shape. The unillustrated terminals are accommodated inside the housing 41.

[Shield Member 40]

As shown in FIG. 1, the shield member 40 is formed by press working a metal plate material into a predetermined shape. An arbitrary metal such as copper, copper alloy, aluminum or aluminum alloy can be appropriately selected as a metal constituting the shield member 40 if necessary. In this embodiment, copper or copper alloy is used.

As shown in FIG. 1, the shield member 40 includes a first shield member 22 arranged on a lower and a second shield member 23 to be mounted on an upper side of the first shield member 22. Note that a vertical direction is used for the convenience of description and does not limit the configuration of the shield member 40.

As shown in FIG. 1, the first shield member 22 is formed by press working the metal plate material into a predetermined shape. The first shield member 22 includes a tube portion 27 having a tubular shape, an inclined portion 28 obliquely extending to a lower-rear side from a rear end part of the tube portion 27 and a tongue piece 29 extending rearward from a rear end part of the inclined portion 28.

The tube portion 27 is in the form of a rectangular tube extending in the front-rear direction and flat in the vertical direction. The housing 41 is inserted into the tube portion 27 from behind and accommodated therein. The housing 41 is held inside the tube portion 27 not to come out rearward by a known technique such as a locking structure.

The inclined portion 28 is connected to the lower wall of the tube portion 27 and parts of both left and right side walls of the tube portion 27 near a lower end part, and extends obliquely to the lower-rear side. The tongue piece 29 extends rearward from the vicinity of a lateral center of the rear end part of the inclined portion 28. The tongue piece 29 is in the form of a plate elongated in the front-rear direction.

[Second Shield Member 23]

As shown in FIG. 1, the second shield member 23 includes an upper wall 25 and side walls 26 extending downward from both left and right side edges of the upper wall 25. Fixing pieces 34 to be crimped to wind around the lower wall of the tube portion 27 of the first shield member 22 extend on the lower end edges of the side walls 26. As shown in FIG. 2, the fixing pieces 34 are crimped to wind around the lower wall of the tube portion 27, whereby the first and second shield members 22, 23 are integrally assembled.

A barrel 30 is formed behind the upper wall 25 and the side walls 26. The barrel 30 is formed to be open downward in a state before being crimped to the cable 10. The barrel 30 is crimped to wind around the folded portion 18 of the cable 10 from outside, whereby the first and second shield members 22, 23 and the cable 10 are connected.

Figure 5:
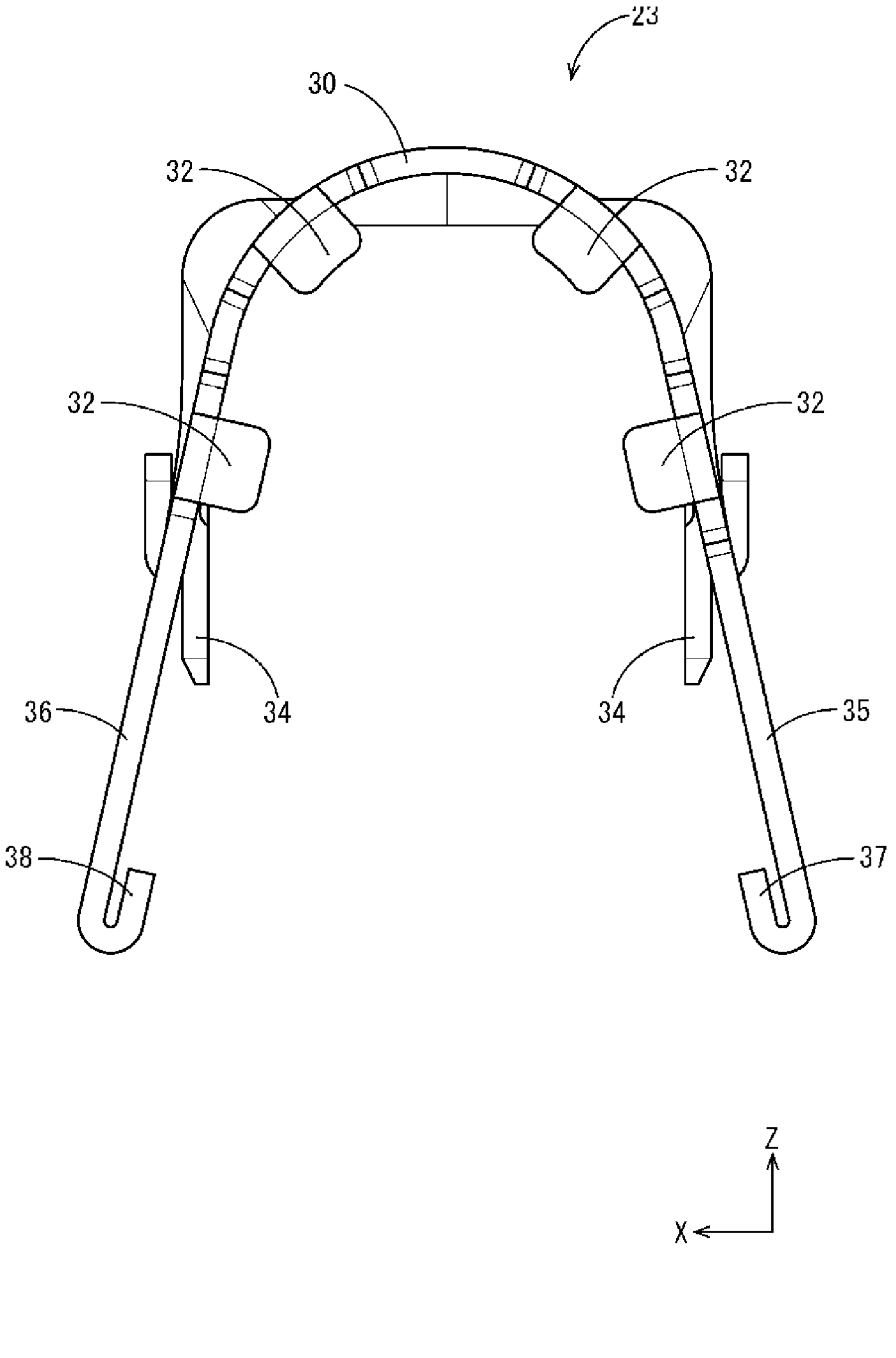
FIG. 5 is a back view showing a second shield member.

As shown in FIG. 5, two right opening preventing pieces 35 extending downward are formed on the right lower end edge of the barrel 30 while being spaced apart in the front-rear direction. One left opening preventing piece 36 extending downward is formed on the left lower end edge of the barrel 30. When viewed from right, the left opening preventing piece 36 is formed to be located between the two right opening preventing pieces 35 in the front-rear direction.

As shown in FIG. 5, a right locking portion 37 is formed on the tip of the right opening preventing piece 35. The right locking portion 37 is formed by folding and bending a tip part of the right opening preventing piece 35 inward. Further, a left locking portion 38 is formed on the tip of the left opening preventing piece 36. The left locking portion 38 is formed by folding and bending a tip part of the left opening preventing piece 36 inward.

Figure 6:
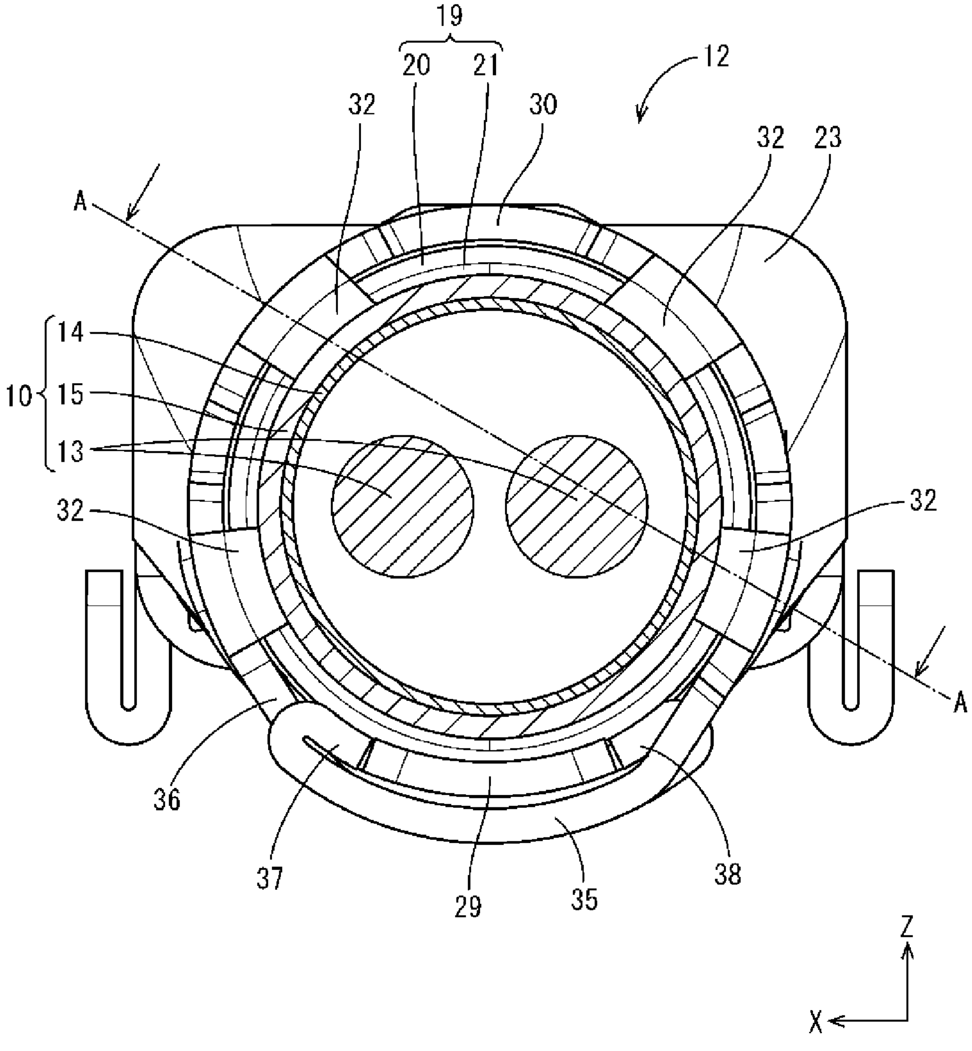
FIG. 6 is a back view showing the connector.

As shown in FIG. 6, with the barrel 30 crimped to the outer periphery of the cable 10, the right locking portions 37 of the right opening preventing pieces 35 are in contact with the left side edge of the tongue piece 29 from left. In this way, the right opening preventing pieces 35 are suppressed from being opened rightward due to springback.

As shown in FIG. 6, with the barrel 30 crimped to the outer periphery of the cable 10, the left locking portion 38 of the left opening preventing piece 36 is in contact with the right side edge of the tongue piece 29 from right. In this way, the left opening preventing piece 36 is suppressed from being opened leftward due to springback.

(Barrel-Side Protrusions 32)

As shown in FIG. 5, a plurality of (four in this embodiment) barrel-side protrusions 32 project radially inwardly of the cable 10 on the rear end edge of the barrel 30 while being spaced part in a circumferential direction of the cable 10. The barrel-side protrusions 32 have a substantially rectangular shape with rounded corners when viewed from behind. The barrel-side protrusions 32 are bent radially inward substantially at a right angle from the rear end edge of the barrel 30.

Figure 7:
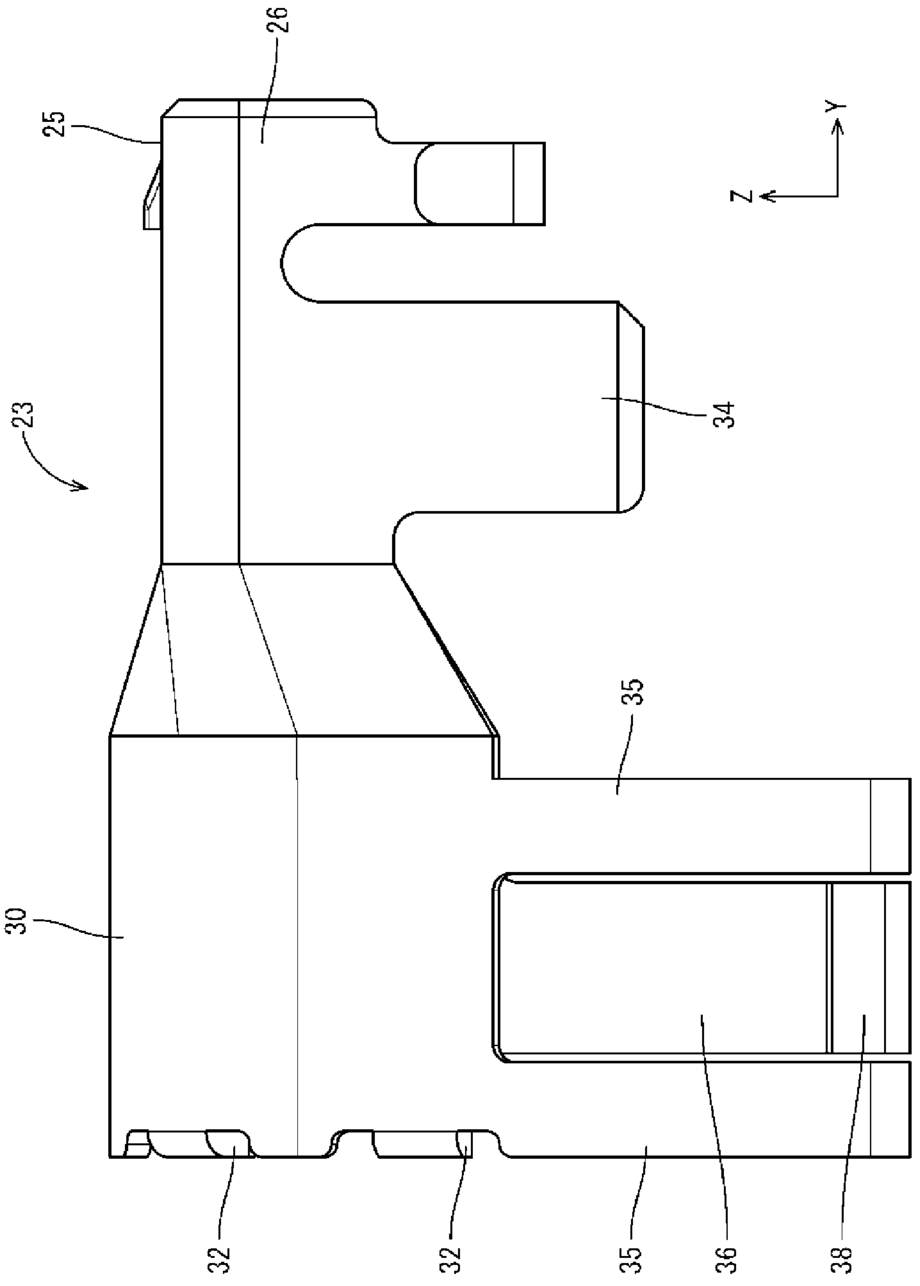
FIG. 7 is a side view showing the second shield member.

As shown in FIG. 7, the rear end edge of the barrel-side protrusion 32 is formed to be substantially flush with that of the barrel 30. In other words, the barrel-side protrusion 32 does not project further rearward than the rear end edge of the barrel 30. In this way, the interference of the barrel-side protrusion 32 with a tool for press working or the like can be suppressed in press working the barrel 30.

Figure 8:
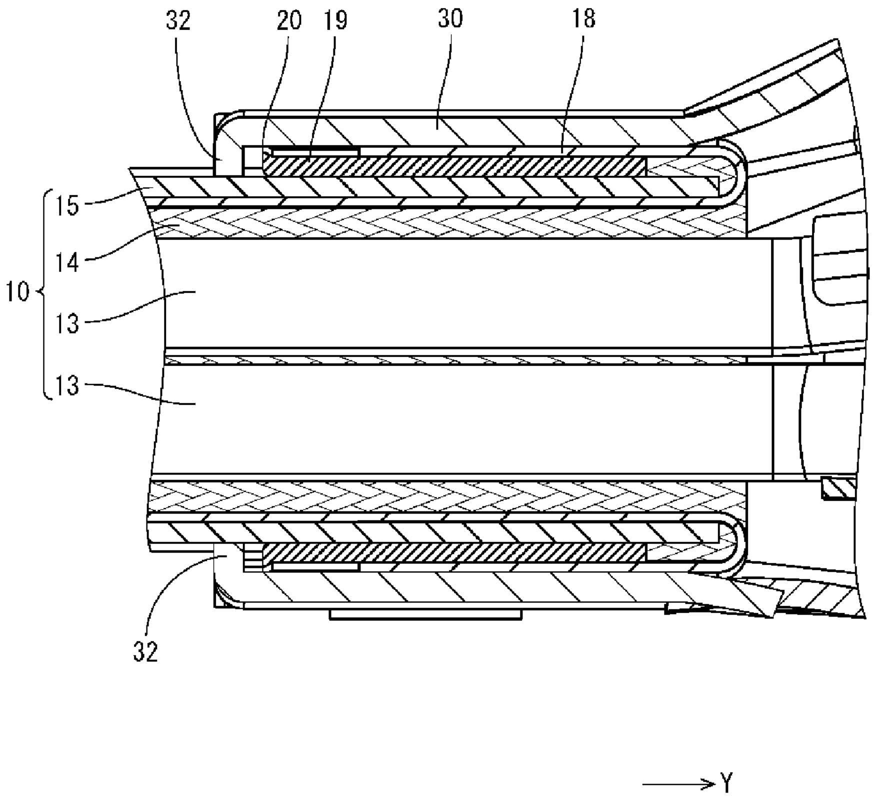
FIG. 8 is a section along A-A in FIG. 6 showing a state where a barrel-side protrusion and a sleeve-side protrusion are separated.
Figure 9:
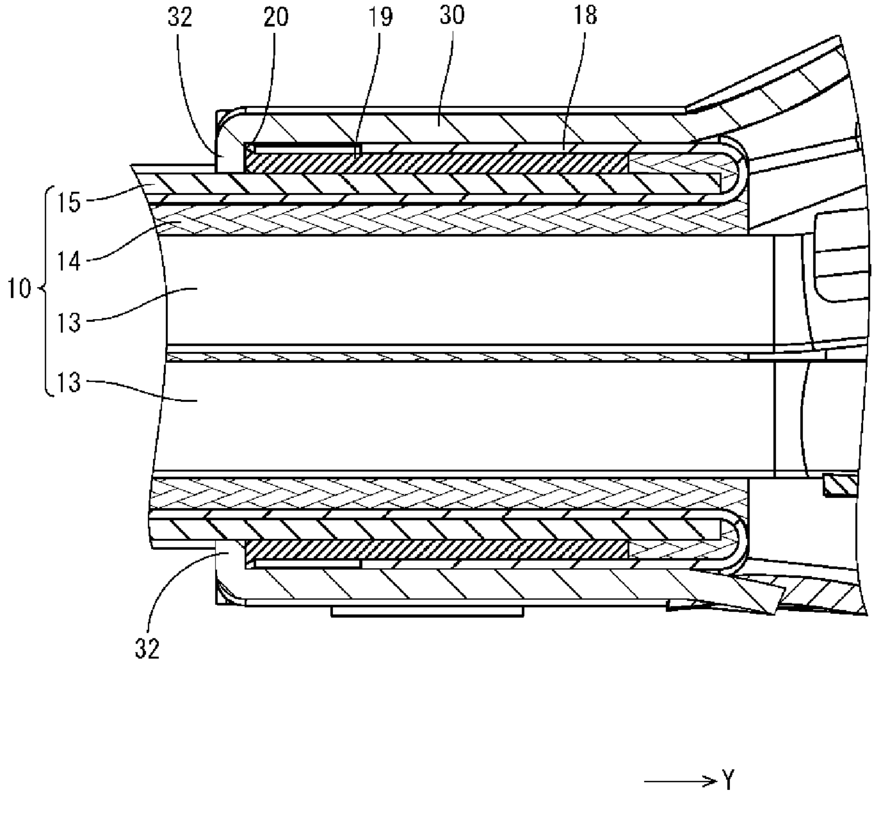
FIG. 9 is a section along A-A in FIG. 6 showing a state where the barrel-side protrusion and the sleeve-side protrusion are in contact.

As shown in FIG. 8, with the barrel 30 crimped to the outer periphery of the folded portion 18, the barrel-side protrusions 32 are disposed at a position behind a rear end part of the sleeve 19 in the axial direction of the cable 10.

A projecting diameter of the barrel-side protrusions 32 radially inwardly of the cable 10 is so set that the barrel-side protrusions 32 are lockable to the rear end edge of the sleeve 19 from behind in the axial direction of the cable 10 with the barrel 30 crimped to the outer periphery of the folded portion 18. In this way, the barrel-side protrusions 32 come into contact with the rear end edge of the sleeve 19 from behind in the axial direction if a force is applied to pull the cable 10 rearward in the axial direction (see FIG. 9).

As shown in FIG. 8, in a state where the cable 10 is not pulled rearward in the axial direction, the rear end edge of the sleeve 19 and the front surfaces of the barrel-side protrusions 32 may be in contact or may be separated.

The plurality of barrel-side protrusions 32 on the rear end part of the barrel 30 are bilaterally symmetrically arranged when viewed from behind. In this way, the sleeve 19 can be received by the bilaterally symmetrically arranged barrel-side protrusions 32 when the cable 10 is pulled rearward in the axial direction. Thus, it can be suppressed that a force is applied to specific barrel-side protrusion(s) 32 in a biased manner (Manufacturing Process of Connector with Cable 12)

Next, an example of a manufacturing process of the connector with cable 12 is described. Note that the process of the connector with cable 12 is not limited to the following process.

The sheath 15 of the cable 10 is stripped over a predetermined length. In this way, the wires 13 and the braided member 14 are exposed from the sheath 15.

A pipe made of metal is cut to a predetermined length and one end part of the cut pipe is expanded in diameter by drawing, thereby forming the sleeve-side protrusion 20 and the tapered surface 21.

The sleeve 19 is externally fit at a position near the front end part of the sheath 15. The braided member 14 exposed from the front end part of the sheath 15 is folded toward the front end part of the sheath 15. In other words, the braided member 14 exposed from the front end part of the sheath 15 is folded rearward in the axial direction of the cable 10. In this way, the folded portion 18 is formed outside the sleeve 19 in the radial direction of the cable 10.

On the other hand, the first and second shield members 22, 23 are integrally assembled by crimping the fixing pieces 34 of the second shield member 23 to the tube portion 27 of the first shield member 22. Subsequently, the barrel 30 is crimped to wind around the outer periphery of the folded portion 18. In this way, the barrel 30 and the folded portion 18 are electrically and physically connected. In the above way, the connector with cable 12 is completed.

[Functions and Effects of Embodiment]

Next, functions and effects of this embodiment are described. This embodiment relates to the connector with cable 12 in which the connector 1 is connected to the end part of the cable 10 and which includes the cable 10 having the wires 13, the sheath 15 and the braided member 14 interposed between the wires 13 and the sheath 15, the braided member 14 being formed by braiding the conductive wire materials, the braided member 14 being provided with the folded portion 18 formed by folding the braided member 14 exposed from the end of the sheath 15 toward the sheath 15, the sleeve 19 made of metal and externally fit to the outer surface of the sheath 15 inside the folded portion in the radial direction of the cable 10, the shield member 40 made of metal and having the barrel 30 for sandwiching the folded portion 18 between the sleeve 19 and the barrel 30 with the barrel 30 crimped to the outer surface of the folded portion 18, and the housing 41 covered with the shield member 40, wherein the barrel 30 is formed with the barrel-side protrusions 32 projecting radially inwardly of the cable 10 at the position behind the rear end part of the sleeve 19 in the axial direction of the cable 10, and the sleeve-side protrusion 20 projecting radially outwardly of the cable 10 is formed on the rear end part of the sleeve 19.

According to this embodiment, a contact area of the barrel-side protrusion 32 and the rear end part of the sleeve 19 is increased as compared to the case where the sleeve-side protrusion 20 projecting radially outwardly of the cable 10 is not provided. In this way, a fixing force of the cable 10 and the connector 11 can be improved.

Further, according to this embodiment, the tapered surface 21 expanded in diameter toward the rear side is formed on the inner surface of the rear end edge of the sleeve 19. In this way, in inserting the cable 10 into the sleeve 19 from behind the sleeve 19, the tapered surface 21 and the cable 10 slide in contact with each other, whereby the cable 10 is guided into the sleeve 19. As a result, the efficiency of an operation of inserting the cable 10 into the sleeve 19 can be improved, wherefore the manufacturing efficiency of the connector with cable 12 can be improved.

Further, according to this embodiment, the barrel 30 is provided with the plurality of barrel-side protrusions 32 spaced apart in the circumferential direction of the cable 10.

In this way, the contact area of the barrel-side protrusions 32 and the rear end edge of the sleeve 19 can be increased as compared to the case where one barrel-side protrusion 32 is provided. Therefore, the fixing force of the cable 10 and the connector 11 can be improved.

<Second Embodiment>

Figure 10:
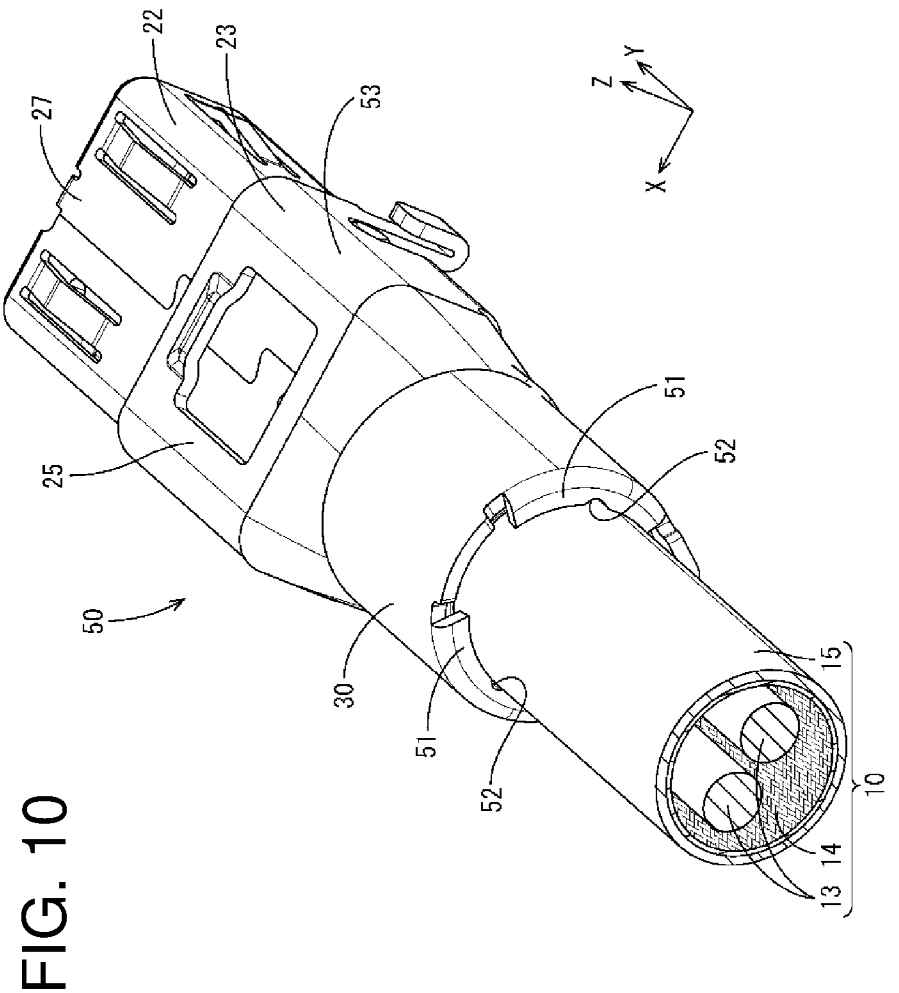
FIG. 10 is a perspective view showing a connector with cable according to a second embodiment.
Figure 11:
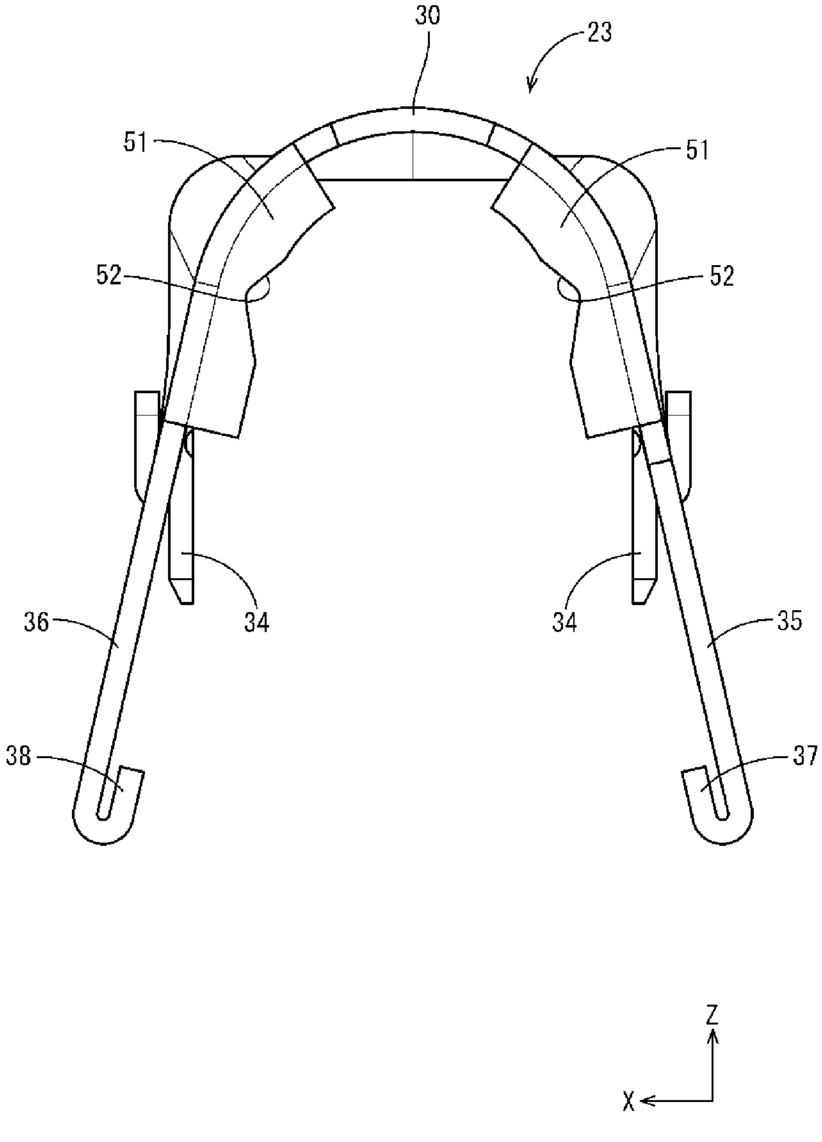
FIG. 11 is a back view showing a second shield member.

Next, a second embodiment of the present disclosure is described with reference to FIGS. 10 to 13. As shown in FIG. 10, in a connector with cable 50 according to this embodiment, the configuration of barrel-side protrusions 51 is different from the first embodiment. As shown in FIG. 11, a plurality of (two in this embodiment) barrel-side protrusions 51 project radially inwardly of a cable 10 on the rear end edge of a barrel 30 while being spaced apart in a circumferential direction of the cable 10. The barrel-side protrusion 51 is formed on each of right and left sides of the barrel 30 when viewed from behind.

As shown in FIG. 11, an escaping portion 52 depressed into a valley shape when viewed from behind is formed near a substantially vertical center on the projecting end edge of the barrel-side protrusion 51 in a state before the barrel 30 is crimped to the cable 10. In other words, the escaping portion 52 is recessed radially outwardly of the cable 10 on the projecting end edge of the barrel-side protrusion 51.

Figure 12:
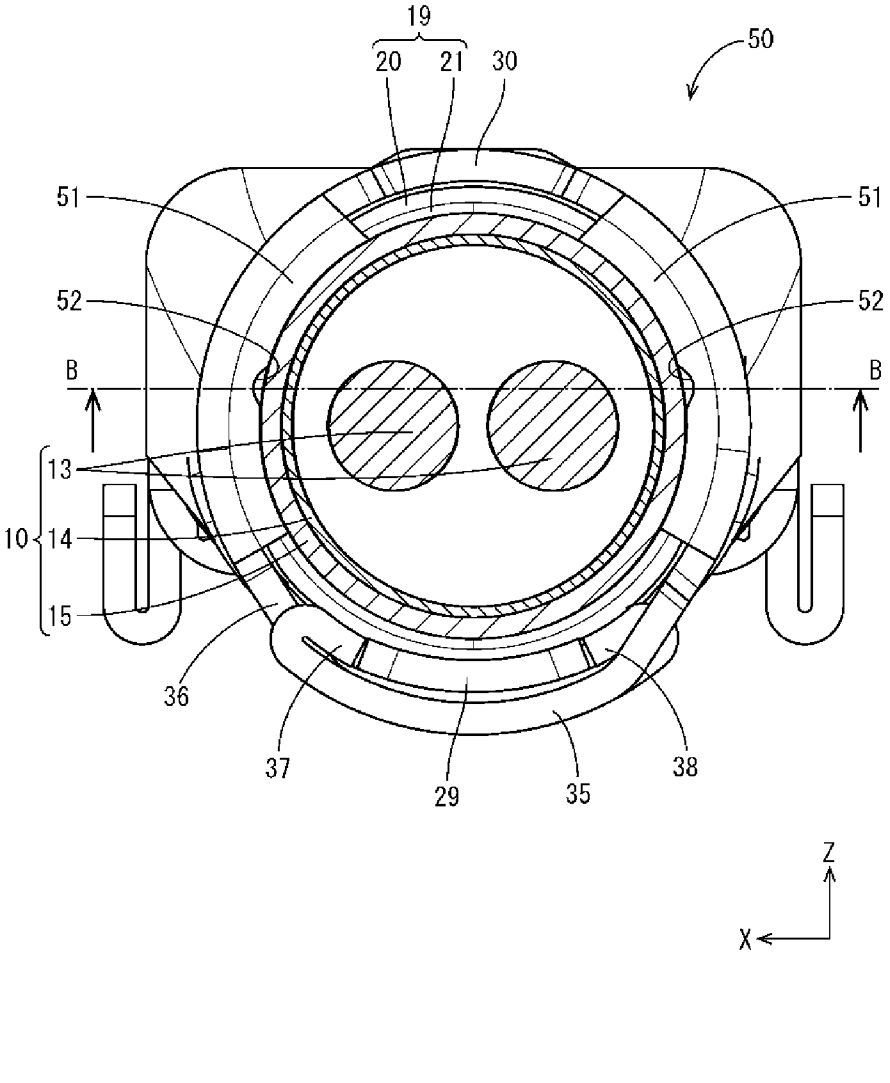
FIG. 12 is a back view showing the connector with cable.

As shown in FIG. 12, the escaping portions 52 formed on the projecting end edges of the barrel-side protrusions 51 are smaller in the circumferential direction of the cable 10 in a state after the barrel 30 is crimped to the cable 10 than in the state before the barrel 30 is crimped to the cable 10.

Figure 13:
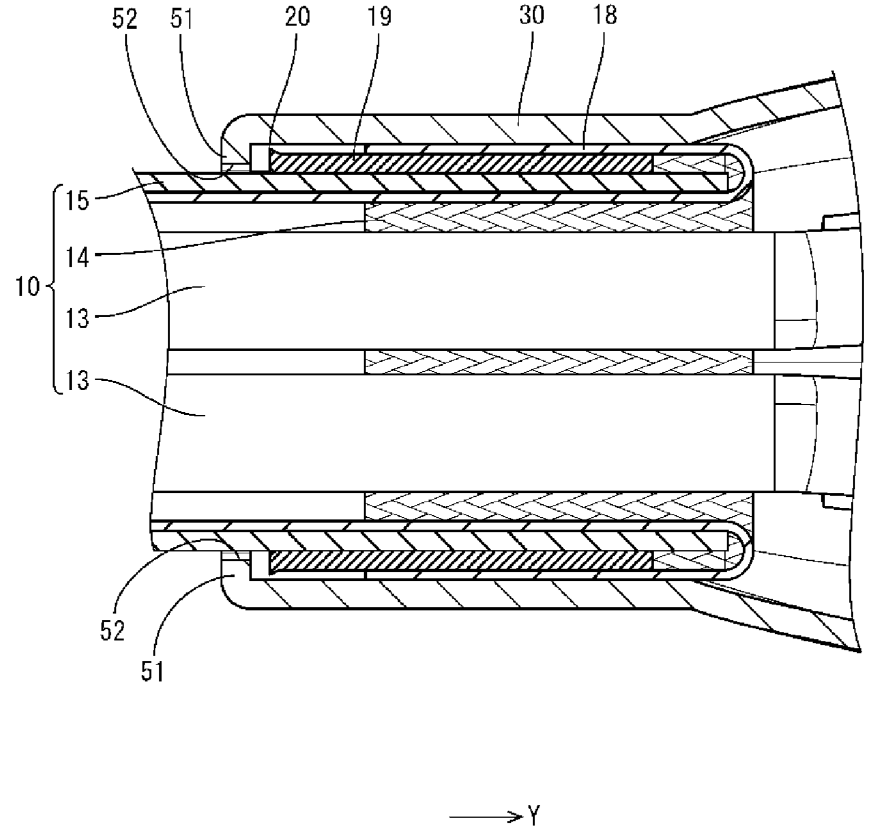
FIG. 13 is a section along B-B in FIG. 12.

As shown in FIG. 13, with the barrel 30 crimped to the outer periphery of a folded portion 18, the barrel-side protrusions 51 are disposed at a position behind a rear end part of a sleeve 19 in an axial direction of the cable 10.

Since the other configuration is substantially the same as in the first embodiment, the same members are denoted by the same reference signs and repeated description is omitted.

As shown in FIG. 12, the projecting end edges of the barrel-side protrusions 51 are compressed in the circumferential direction of the cable 10 in the state after the barrel 30 is crimped to the cable 10. Thus, there is a concern that a metal plate material constituting inner edge parts of the barrel-side protrusions 51 concentrates on the projecting end edges of the barrel-side protrusions 51 and creases are formed.

Accordingly, in this embodiment, the escaping portions 52 depressed into a valley shape are formed on the projecting end edges of the barrel-side protrusions 51. In this way, even if the metal plate material concentrates on the projecting end edges of the barrel-side protrusions 51 in the state after the barrel 30 is crimped to the cable 10, the formation of creases in the barrel-side protrusions 51 can be suppressed.

Further, since a contact area of the barrel-side protrusions 51 and the rear end edge of the sleeve 19 can be increased as compared to the case where the barrel-side protrusions 51 are provided at intervals, a fixing force of the cable 10 and a connector 53 can be improved.

Since the other configuration is substantially the same as in the first embodiment, the same members are denoted by the same reference signs and repeated description is omitted.

<Other Embodiments>

The technique disclosed in this specification is not limited to the above described and illustrated embodiments. For example, the following embodiments are also included in the technical scope of the technique described in this specification.

(1) The barrel 30 may be provided with one, three, five or more barrel-side protrusions.

(2) A plurality of sleeve-side protrusions 20 may be formed at intervals in the circumferential direction of the sleeve.

LIST OF REFERENCE NUMERALS

10: cable
11, 53: connector
12, 50: connector with cable
13: wire
14: braided member
15: sheath
18: folded portion
19: sleeve
20: sleeve-side protrusion
21: tapered surface
22: first shield member
23: second shield member
25: upper wall
26: side wall
27: tube portion
28: inclined portion
29: tongue piece
30: barrel
32, 51: barrel-side protrusion
34: fixing piece
35: right opening preventing piece
36: left opening preventing piece
37: right locking portion
38: left locking portion

40: shield member

41: housing

52: escaping portion

What is claimed is:

1. A connector with cable in which a connector is connected to an end part of a cable, comprising:

a cable including a wire, a sheath and a braided member interposed between the wire and the sheath, the braided member being formed by braiding conductive wire materials, the braided member being provided with a folded portion formed by folding the braided member exposed from an end of the sheath toward the sheath;

a sleeve made of metal, the sleeve being externally fit to an outer surface of the sheath inside the folded portion in a radial direction of the cable;

a shield member made of metal, the shield member including a barrel for sandwiching the folded portion between the sleeve and the barrel while being crimped to an outer surface of the folded portion; and a housing covered with the shield member, wherein:

the barrel is formed with a barrel-side protrusion projecting radially inwardly of the cable at a position behind a rear end part of the sleeve in an axial direction of the cable, a sleeve-side protrusion projecting radially outwardly of the cable is formed on a rear end part of the sleeve, and a tapered surface expanded in diameter toward a rear side is formed on an inner surface of a rear end edge of the sleeve.

2. A connector with cable in which a connector is connected to an end part of a cable, comprising:

a cable including a wire, a sheath and a braided member interposed between the wire and the sheath, the braided member being formed by braiding conductive wire materials, the braided member being provided with a folded portion formed by folding the braided member exposed from an end of the sheath toward the sheath;

a sleeve made of metal, the sleeve being externally fit to an outer surface of the sheath inside the folded portion in a radial direction of the cable;

a shield member made of metal, the shield member including a barrel for sandwiching the folded portion between the sleeve and the barrel while being crimped to an outer surface of the folded portion; and a housing covered with the shield member, wherein:

the barrel is formed with a barrel-side protrusion projecting radially inwardly of the cable at a position behind a rear end part of the sleeve in an axial direction of the cable, a sleeve-side protrusion projecting radially outwardly of the cable is formed on a rear end part of the sleeve, and an escaping portion for allowing an inner edge part in the radial direction of the cable, out of the barrel-side protrusion, to escape with the barrel crimped to the outer surface of the folded portion is formed to be recessed radially outwardly of the cable on a projecting end edge projecting radially inwardly of the cable, out of the barrel-side protrusion.

3. A connector with cable in which a connector is connected to an end part of a cable, comprising:

a cable including a wire, a sheath and a braided member interposed between the wire and the sheath, the braided member being formed by braiding conductive wire materials, the braided member being provided with a folded portion formed by folding the braided member exposed from an end of the sheath toward the sheath;

a sleeve made of metal, the sleeve being externally fit to an outer surface of the sheath inside the folded portion in a radial direction of the cable;

a shield member made of metal, the shield member including a barrel for sandwiching the folded portion between the sleeve and the barrel while being crimped to an outer surface of the folded portion; and a housing covered with the shield member, wherein:

the barrel is formed with a barrel-side protrusion projecting radially inwardly of the cable at a position behind a rear end part of the sleeve in an axial direction of the cable, a sleeve-side protrusion projecting radially outwardly of the cable is formed on a rear end part of the sleeve, and the barrel is provided with a plurality of the barrel-side protrusions spaced apart in the circumferential direction of the cable.

* * * * *